(12) United States Patent
Bak et al.

(10) Patent No.: US 11,538,142 B2
(45) Date of Patent: Dec. 27, 2022

(54) IMAGE SIGNAL PROCESSOR, OPERATING METHOD THEREOF, AND IMAGE PROCESSING SYSTEM INCLUDING THE IMAGE SIGNAL PROCESSOR

(71) Applicant: Samsung Electronics Co., Ltd., Suwon-si (KR)

(72) Inventors: Jongchul Bak, Seongnam-si (KR); Keunhwi Koo, Gyeongju-si (KR); Hyoungjoon Kim, Suwon-si (KR); Joonyoung Chang, Hwaseong-si (KR); Kilhyung Cha, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 330 days.

(21) Appl. No.: 16/835,995

(22) Filed: Mar. 31, 2020

(65) Prior Publication Data
US 2020/0388016 A1     Dec. 10, 2020

(30) Foreign Application Priority Data
Jun. 10, 2019   (KR) ........................ 10-2019-0068267

(51) Int. Cl.
*G06K 9/54*     (2006.01)
*G06T 5/50*     (2006.01)
(Continued)

(52) U.S. Cl.
CPC .............. *G06T 5/50* (2013.01); *G06T 1/0014* (2013.01); *G06T 1/20* (2013.01); *G06T 1/60* (2013.01); *G06T 7/223* (2017.01)

(58) Field of Classification Search
CPC .......... G06T 5/50; G06T 1/0014; G06T 1/20; G06T 1/60; G06T 7/223; H04N 5/23229; H04N 5/23245
See application file for complete search history.

(56) References Cited

U.S. PATENT DOCUMENTS 5,499,101 A  *  3/1996  Watanabe ............ H04N 1/2307
                                                358/464
8,125,534 B2    2/2012  Shimonaka
(Continued)

FOREIGN PATENT DOCUMENTS

JP   2006187906 A  *  7/2006
JP   2009141543 A  *  6/2009
(Continued)

OTHER PUBLICATIONS

ROS-DMA: A DMA Double Buffering Method for Embedded Image Processing with Resource Optimized Slicing, Christian Zinner et al., IEEE, 0-7695-2516-4, 2006, pp. 1-12 (Year: 2006).*
(Continued)

*Primary Examiner* — Jayesh A Patel
(74) *Attorney, Agent, or Firm* — Harness, Dickey & Pierce, P.L.C.

(57) ABSTRACT

An image signal processor, an operating method thereof, and an image processing system are provided. The image processing system includes: a control processor configured to generate and output setting information corresponding to N (where N is an integer of 2 or more) image frames; and an image signal processor configured to perform image processing on the N image frames received from an image sensor based on the setting information, and generate an interrupt signal and transmit the interrupt signal to the control processor based on completion of the image processing performed on the N image frame.

20 Claims, 14 Drawing Sheets

(51) Int. Cl.
*G06T 7/223* (2017.01)
*G06T 1/00* (2006.01)
*G06T 1/20* (2006.01)
*G06T 1/60* (2006.01)

(56) References Cited

U.S. PATENT DOCUMENTS

| | | | |
|---|---|---|---|
| 8,264,565 B2 | 9/2012 | Sakaguchi et al. | |
| 8,345,131 B2* | 1/2013 | Kuroki | H04N 5/2625 348/262 |
| 8,350,791 B2* | 1/2013 | Takahashi | H04N 5/23241 345/87 |
| 9,654,697 B2 | 5/2017 | Takenaka et al. | |
| 9,832,379 B1* | 11/2017 | Neglur | H04N 5/3698 |
| 10,091,434 B2* | 10/2018 | Lee | H04N 5/2355 |
| 2002/0013867 A1* | 1/2002 | Matsuki | G06T 1/60 710/22 |
| 2006/0224807 A1* | 10/2006 | Ishikawa | G06F 13/364 710/241 |
| 2008/0222330 A1* | 9/2008 | Shima | G06F 13/28 710/106 |
| 2010/0199071 A1* | 8/2010 | Nakazono | G06T 1/20 712/201 |
| 2013/0235239 A1* | 9/2013 | Wu | H04N 5/3765 348/372 |
| 2015/0117795 A1* | 4/2015 | Takasaka | G06T 3/40 382/303 |
| 2016/0080652 A1* | 3/2016 | Shirota | H04N 5/232411 348/222.1 |
| 2016/0086307 A1* | 3/2016 | Yoon | G09G 5/005 345/660 |
| 2017/0078573 A1* | 3/2017 | Chen | H04N 5/232411 |
| 2018/0070009 A1* | 3/2018 | Baek | H04N 5/23232 |

FOREIGN PATENT DOCUMENTS

| | | | |
|---|---|---|---|
| JP | 2012221138 A | * 11/2012 | |
| JP | 2014075028 A | * 4/2014 | G06T 1/20 |
| JP | 2017-143404 A | 8/2017 | |
| KR | 20150034953 A | 4/2015 | |
| WO | WO-2013056198 A1 | * 4/2013 | G06T 1/20 |

OTHER PUBLICATIONS

Design ofa DMA Controller for Loss-less Image Processing, Seong Mo Lee et al., IDEC, Jul. 2016, pp. 1-6 (Year: 2016).*
Real-time evaluation techniques for real-time image processing hardware, R. Venkateswarlu et al., SPIE, 1992, pp. 1-11 (Year: 1992).*
Front vehicle tracking using scene analysis, Kai-Tai Song et al, IEEE, 0-7803-9044-X, 2005, pp. 1323-1328 (Year: 2005).*
Research on frame capture of high speed and image storage, Hao Dong et al., SPIE, 2006, pp. 1-18 (Year: 2006).*
A Reconfigurable Embedded System for 1000 f/s Real-Time Vision, Takashi Komuro et al., IEEE, Apr. 2010, pp. 496-504 (Year: 2010).*

* cited by examiner

IMAGE SIGNAL PROCESSOR, OPERATING METHOD THEREOF, AND IMAGE PROCESSING SYSTEM INCLUDING THE IMAGE SIGNAL PROCESSOR

CROSS-REFERENCE TO RELATED APPLICATION

This application claims the benefit of Korean Patent Application No. 10-2019-0068267, filed on Jun. 10, 2019, in the Korean Intellectual Property Office, the disclosure of which is incorporated herein in its entirety by reference.

BACKGROUND

The inventive concepts relate to image signal processing, and more particularly, to image signal processors for performing image processing on image data received from an image sensor, operating methods of the image signal processor, and/or image processing systems including the image signal processor.

An image signal processor included in an imaging device such as a camera or a smartphone may perform image processing such as converting a data format of image data provided from an image sensor into a data format, such as RGB or YUV, or removing noise from the image data and adjusting brightness. The image signal processor may process, by units of frames, the image data output from the image sensor. As imaging devices have supported operation modes of providing an image at a high frame rate such as a slow motion mode or a super slow motion mode, the image sensor may generate and output image data at a high frame rate. Therefore, an image signal processor for normally performing image processing on image data having a high frame rate may be beneficial.

SUMMARY

The inventive concepts provide image signal processors capable of fast readout for normally performing image processing on image data received at a high frame rate, operating methods of the image signal processor, and an image processing system including the image signal processor.

According to aspects of the inventive concepts, there is provided an image processing system including a control processor configured to generate and output setting information corresponding to N (where N is an integer equal to or more than two) image frames and an image signal processor configured to perform image processing on the N image frames received from an image sensor based on the setting information, and generate an interrupt signal and transmit the interrupt signal to the control processor based on completion of the image processing performed on the N image frame.

According to other aspects of the inventive concepts, there is provided an image signal processor including an image processing engine configured to perform image processing on image frames sequentially received from an image sensor, a direct memory access (DMA) controller configured to store processing data, generated by the image processing engine, in a memory, and a fast readout circuit configured to receive setting information, including N (where N is an integer equal to or more than two) setting values corresponding to N image frames, from a control processor and, provide a setting value of an image frame, on which image processing is performed, to the image processing engine or the DMA controller, based on the image processing being sequentially performed on the N image frames.

According to other aspects of the inventive concepts, there is provided an operating method of an image signal processor, the operating method including receiving N (where N is an integer equal to or more than two) setting values from a control processor, storing the N setting values in a storage area, receiving image frames from an image sensor, sequentially performing image processing on N image frames of the image frames based on the N setting values, and generating an end interrupt signal based on completion of the image processing performed on the N image frames.

According to other aspects of the inventive concepts, there is provided an application processor including a main processor configured to generate and output setting information including N (where N is an integer equal to or more than two) setting values and an image signal processor configured to receive and store the setting information and sequentially perform image processing on N image frames received from an image sensor based on the setting information, and generate an end interrupt signal and transmit the end interrupt signal to an image signal processor based on completion of image processing performed on the N image frames.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
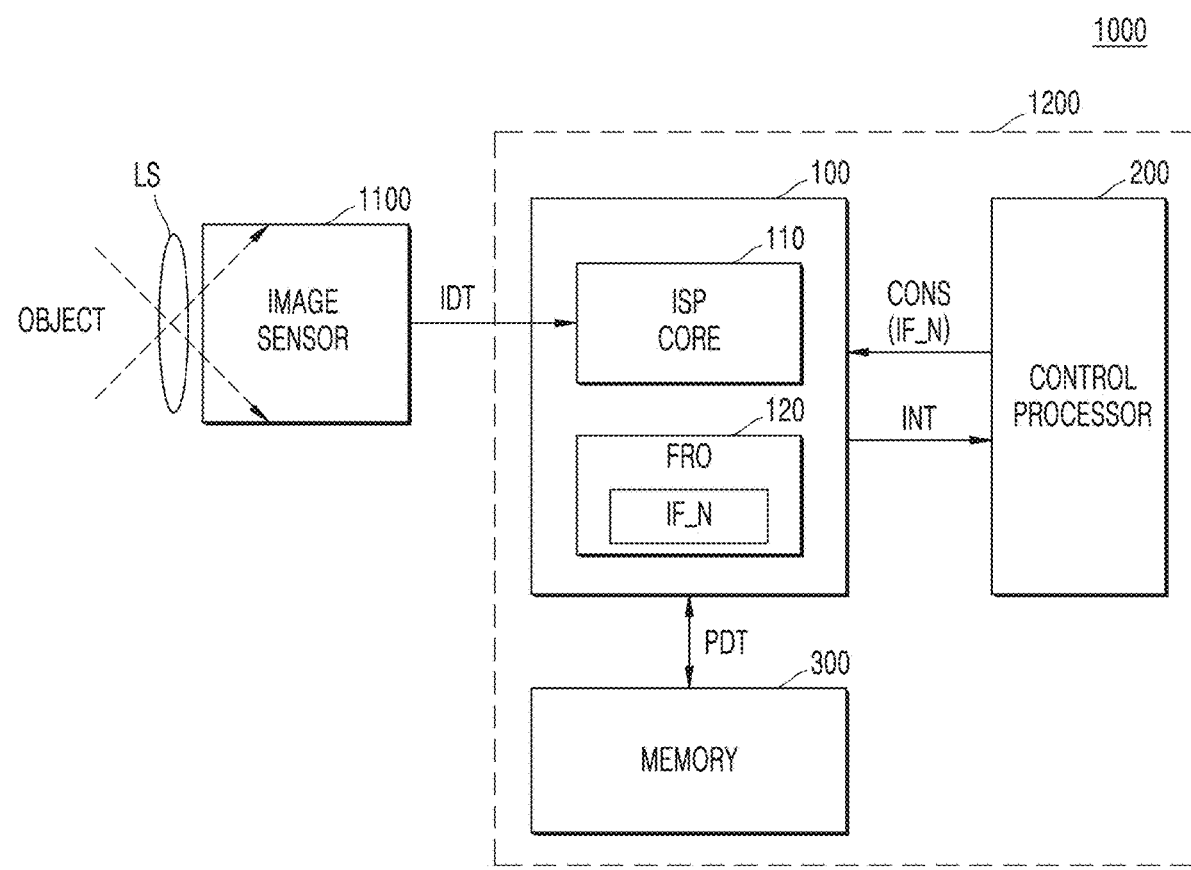
FIG. 1 is a block diagram illustrating an image processing device according to an example embodiment.

FIG. 1 is a block diagram illustrating an image processing device 1000 according to an example embodiment.

The image processing device 1000 may be implemented as an electronic device which captures an image and displays the captured image or performs an operation based on the captured image. The image processing device 1000 may be implemented as, for example, a personal computer (PC), an Internet of things (IoT) device, and/or a portable electronic device. Examples of the portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, wearable device, etc. Also, the image processing device 1000 may be equipped in an electronic device, such as a drone or an advanced drivers assistance system (ADAS), and/or an electronic device provided as a componentry in vehicles, furniture, manufacturing facilities, and various measuring machines.

Referring to FIG. 1, the image processing device 1000 may include an image sensor 1100 and an image processing system 1200. The image processing device 1000 may further include other elements such as a display and a user interface. The image processing system 1200 may include an image signal processor 100, a control processor 200, and a memory 300. The image signal processor 100, the control processor 200, and the memory 300 may be implemented as a single semiconductor chip or a plurality of semiconductor chips. For example, the image signal processor 100 and the control processor 200 may be integrated into one semiconductor chip.

The image processing system 1200 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As disclosed herein, the term "memory", "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

The image sensor 1100 may convert an optical signal, which is input through an optical lens LS and corresponds to an object, into an electrical signal and may generate and output the image data IDT on the basis of electrical signals. The image sensor 1100 may include, for example, a pixel array including a plurality of pixels arranged two-dimensionally and a readout circuit, and the pixel array may convert received optical signals into the electrical signals. The pixel array may be implemented with, for example, an optical-to-electric conversion device such as a charge coupled device CCD or a complementary metal oxide semiconductor (CMOS), and in addition, may be implemented with other various kinds of optical-to-electric conversion devices. The readout circuit may generate raw data on the basis of an electrical signal provided from the pixel array and may output, as image data IDT, the generated raw data or raw data on which preprocessing such as removing bad pixel has been performed. The image sensor 1100 may be implemented as a semiconductor chip or package including the pixel array and the readout circuit.

The image signal processor 100 may perform image processing on the image data IDT provided from the image sensor 1100. For example, the image signal processor 100 may perform image processing, such as image processing of converting a data format of the image data IDT (for example, converting an image data having a Bayer pattern into a YUV or RGB format), removing noise, adjusting brightness, and adjusting sharpness, for enhancing image quality. The image signal processor 100 may configure hardware of the image processing system 1200.

The image signal processor 100 may include an image signal processing core 110 (hereinafter referred to as an ISP core) and a fast readout circuit 120 (hereinafter referred to as an FRO circuit). The ISP core 110 may perform, by units of frames, image processing on the image data IDT output from the image sensor 1100. The ISP core 110 may be referred to as an image processing engine. Processing data PDT (for example, an image-processed frame (hereinafter referred to as converted image data) and/or result data (statistic data, histogram, etc.) generated through image processing) generated through image processing may be stored in the memory 300.

The FRO circuit 120 may store setting information IF_N including setting values of a plurality of image frames (hereinafter referred to as N (where N is a positive integer equal to or more than two) number of frames) provided from the control processor 200, and in a case where image processing is performed on a certain image frame, the FRO circuit 120 may provide a setting value (a current setting value) of a corresponding image frame (a current image frame). For example, setting information (e.g., setting values of frames) may include register values (for example, register values used by the ISP core 110 in an image processing process) for adjusting the image quality of an image frame and address register values representing an area, the processing data PDT corresponding to each frame is to be stored, of the memory 300. Such setting values may be set (or changed) at every frame.

Figure 2:
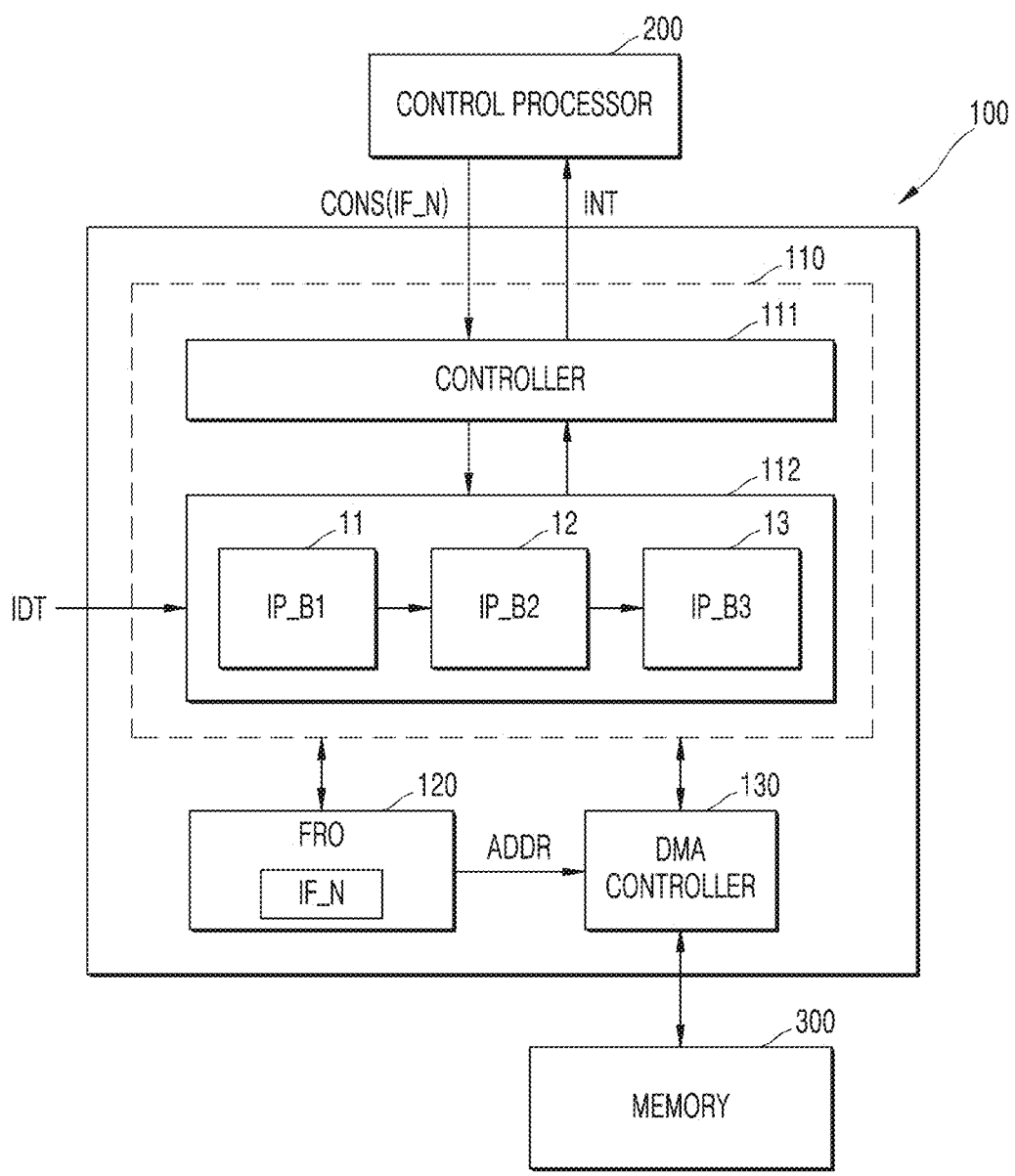
FIG. 2 is a block diagram illustrating an image signal processor according to an example embodiment.

The FRO circuit 120 may receive and store the setting information IF_N about the N frames from the control processor 200, and in a case where image processing is performed on each of the N frames, the FRO circuit 120 may provide setting values of a corresponding frame to the ISP core 110 or another circuit (for example, a direct memory access (DMA) controller 130 of FIG. 2). Therefore, image processing may be performed on the N frames by units of frames.

When image processing performed on the N frames is completed, the FRO circuit 120 may generate an interrupt signal INT indicating completion of image processing performed on the N frames, or may issue a request, to the ISP core 110, to generate the interrupt signal INT.

For example, the FRO circuit 120 may store the setting information IF_N about the N frames received from the control processor 200 though a one-time receiving process. In a case where image processing is performed on each of the N frames, the FRO circuit 120 may provide setting values of a corresponding frame, and when image processing performed on the N frames is completed, the FRO circuit 120 may generate the interrupt signal INT.

The control processor 200 may control the image signal processor 100 to perform image processing. The control processor 200 may include processing circuitry such as hardware including logic circuits; a hardware/software combination such as a processor executing software; or a combination thereof, for example to configure software of the image processing system 1200. The control processor 200 may be a central processing unit (CPU), a microprocessor, an ARM processor, an X86 processor, a microprocessor without interlocked pipeline stages (MIPS) processor, a graphics processing unit (GPU), a general-use GPU, and/or another processor configured to execute instructions stored in a memory. The control processor 200 may process or execute data and an instruction code (or programs) including an execution algorithm of the image signal processor 100 to generate a control signal CONS for controlling the control processor 200. The control signal CONS may include the setting information IF_N about the N frames.

The control processor 200 may previously generate the setting information IF_N about the N frames, and before image processing starts to be performed on the N frames, the control processor 200 may transmit the setting information IF_N to the image signal processor 100. The control processor 200 may generate setting information about next N frames while the image signal processor 100 is performing image processing on the N frames, and before image processing performed on the N frames is completed, namely, before the interrupt signal INT indicating completion of image processing performed on the N frames is received from the image signal processor 100, the control processor 200 may transmit the generated setting information about the next N frames to the image signal processor 100. The control processor 200 may generate and transmit the setting information about the next N frames while the image signal processor 100 is performing image processing on the N frames.

The memory 300 may store the processing data PDT received from the image signal processor 100 and may provide the processing data PDT to the image signal processor 100, the control processor 200, or the other elements of the image processing device 1000.

The memory 300 may be implemented as a volatile memory or a non-volatile memory. Examples of the volatile memory may include dynamic random access memory (DRAM), static random access memory (SRAM), etc., and examples of the non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), etc.

FIG. 2 is a block diagram illustrating an image signal processor 100 according to an example embodiment. FIG. 2 illustrated in detail the image signal processor 100 of FIG. 1.

Referring to FIG. 2, the image signal processor 100 may include an ISP core 110, an FRO circuit 120, and a DMA controller 130. The ISP core 110 may include a controller 111 and a plurality of intellectual property (IP) blocks 112. In FIG. 2, the plurality of IP blocks 112 are illustrated as including first to third IP blocks 11 to 13 (e.g., IP_B1, IP_B2 and IP_B3), but are not limited thereto and may include two or more IP blocks.

The controller 111 may receive a control signal CONS from the control processor 200 and may control an overall operation of the image signal processor 100 on the basis of the control signal CONS. The control signal CONS may include setting information IF_N about N frames, and the controller 111 may provide the FRO circuit 120 with the setting information IF_N about the N frames. The FRO circuit 120 may store the received setting information IF_N, and when image processing is performed on the basis of setting values included in the setting information IF_N at every frame, the FRO circuit 120 may provide the stored setting information IF_N to the plurality of IP blocks 112 or the DMA controller 130.

The plurality of IP blocks 112 (e.g., the first to third IP blocks 11 to 13) set as an image processing block may perform image processing, and the first to third IP blocks 11 to 13 may perform different image processing. In some example embodiments, the first IP block 11 may convert a data format of image data IDT, the second IP block 12 may adjust brightness, and the third IP block 13 may adjust contrast. The first to third IP blocks 11 to 13 may sequentially perform image processing on a frame. An image-processing-completed frame and/or result data (for example, converted image data) obtained based on image processing by each of the first to third IP blocks 11 to 13 may be stored in the memory 300. The plurality of IP blocks 112 may receive a setting value corresponding to a processed frame from the FRO circuit 120 and may perform image processing on a corresponding frame on the basis of the setting value.

The DMA controller 130 may store the processing data PDT, received from at least one of the first to third IP blocks 11 to 13, in the memory 300. The processing data PDT may include result data and/or converted image data based on image processing. At this time, the DMA controller 130 may receive an address ADDR (or an address register value) from the FRO circuit 120 and may store the processing data PDT in a storage area, corresponding to the address ADDR, of the memory 300.

For example, when image processing is performed on a first frame (or when image processing is completed), the FRO circuit 120 may generate a first address on the basis of an address register value representing an area where converted image data (for example, first converted image data) of the first frame is to be stored in the stored setting information IF_N and may provide the first address (or a first address register value) to the DMA controller 130, and the DMA controller 130 may store the first converted image data in an area corresponding to the first address. Subsequently, when image processing is performed on a second frame, the FRO circuit 120 may generate a second address on the basis of an address register value representing an area where converted image data (for example, second converted image data) of the second frame is to be stored in the stored setting information IF_N and may provide the second address (or a second address register value) to the DMA controller 130, and the DMA controller 130 may store the second converted image data in an area corresponding to the second address.

When image processing performed on the N frames is completed, the FRO circuit 120 may generate an interrupt signal INT representing completion of image processing.

The FRO circuit 120 may transmit the interrupt signal INT to the control processor 200 directly or the controller 111. In some example embodiments, the FRO circuit 120 may issue a request, to the controller 111, to generate the interrupt signal, and in response to the request, the controller 111 may generate and transmit the interrupt signal INT.

Figure 3A:
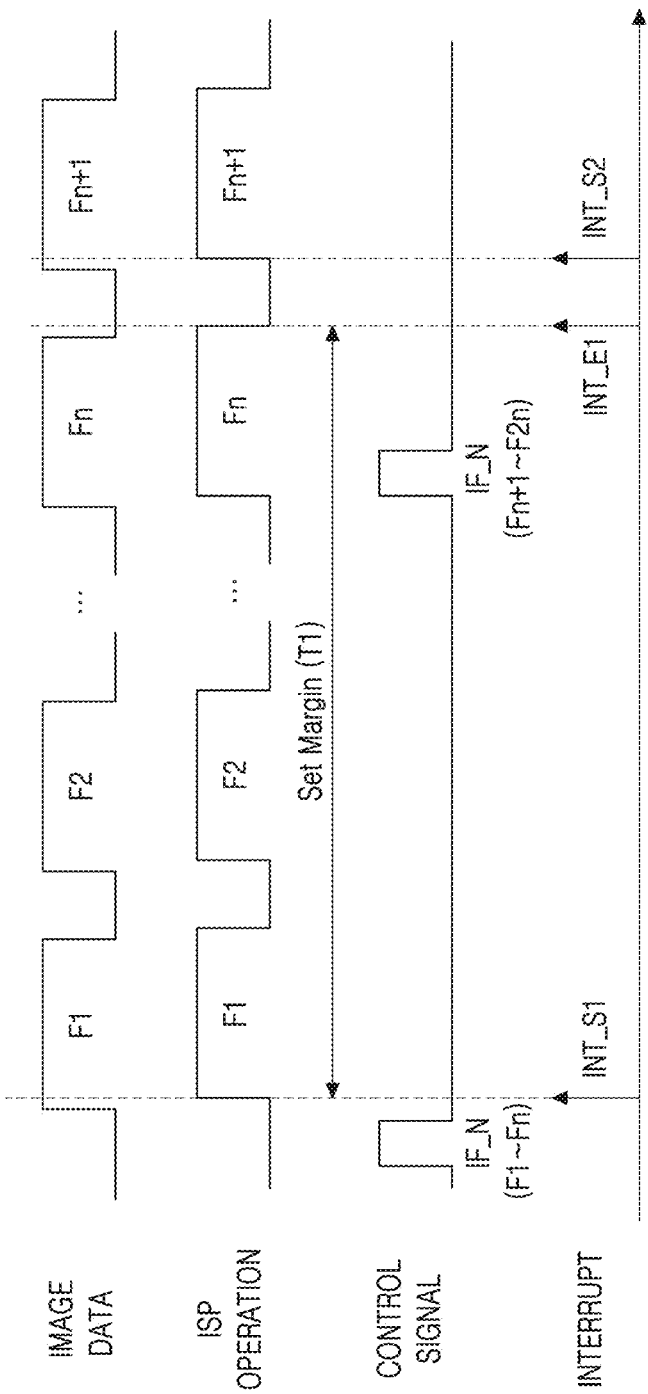
FIG. 3A is a timing diagram illustrating a transmitted/received signal and an operation of an image signal processor according to an example embodiment.
Figure 3B:
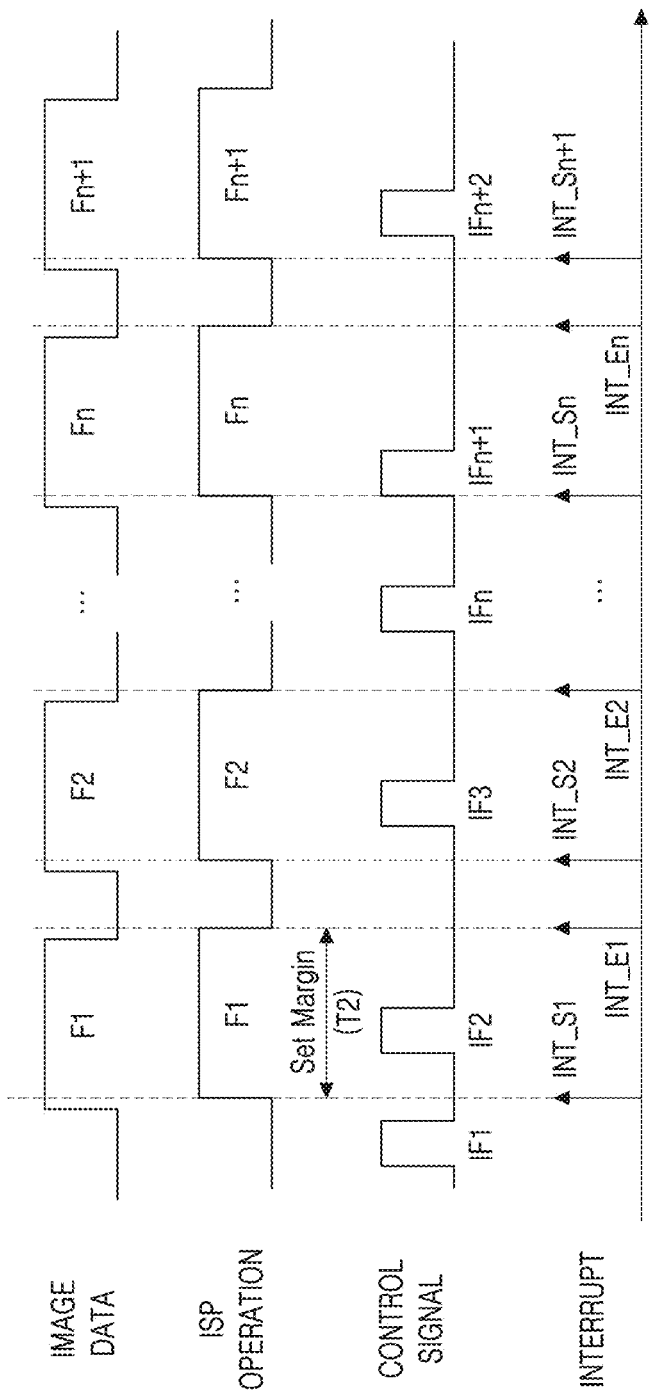
FIG. 3B is a timing diagram illustrating a transmitted/received signal and an operation of an image signal processor according to a comparative example.

FIG. 3A is a timing diagram illustrating a transmitted/received signal and an operation of an image signal processor 100 according to an example embodiment, and FIG. 3B is a timing diagram illustrating a transmitted/received signal and an operation of an image signal processor according to a comparative example. FIG. 3A illustrates an operation of the image signal processor 100 of FIG. 1.

Referring to FIG. 3A, the image signal processor 100 may receive image data by units of frames. For example, the image signal processor 100 may receive first to $n+1^{th}$ frames F1 to Fn+1. The image signal processor 100 may perform image processing on a received frame.

Before image processing is performed, the image signal processor 100 may receive a control signal for controlling processing of a frame from a control processor (200 of FIG. 1). The image signal processor 100 may receive setting information IF_N1 including setting values of N frames (for example, first to $N^{th}$ frames) F1 to Fn. When a frame (for example, the first frame F1) is received after the setting information IF_N1 is received, the image signal processor 100 may start to perform image processing and may transmit a start interrupt signal INT_S1 indicating the start of image processing to the control processor 200.

The image signal processor 100 may perform image processing on the N frames F1 to Fn. As described above, an FRO circuit (120 of FIG. 1) may store the setting information IF_N1, and when image processing starts to be performed on each frame, the FRO circuit 120 may provide a setting value of a corresponding frame. Moreover, the image signal processor 100 may receive setting information IF_N2 about next N frames (for example, $n+1^{th}$ to $2n^{th}$ frames) Fn+1 to F2n from the control processor 200 while image processing is being performed on the N frames F1 to Fn.

When image processing is performed on the N frame F1 to Fn, the image signal processor 100 may transmit an end interrupt signal INT_E1, indicating completion of image processing performed on the N frames, to the control processor 200. Subsequently, when a frame is received again (for example, when the $n+1^{th}$ frame Fn+1 is received), the image signal processor 100 may start to perform image processing and may transmit a start interrupt signal INT_S2, indicating the start of image processing, to the control processor 200.

As described above, the image signal processor 100 according to some example embodiments may receive the setting information IF_N1 and IF_N2 by units of N frames and may perform image processing on the N frames on the basis of the received setting information, and when image processing performed on the N frames is completed, the image signal processor 100 may transmit end interrupt signals INT_E1 and INT_E2, indicating completion of image processing, to the control processor 200. At this time, the FRO circuit 120 included in the image signal processor 100 may store the setting information IF_N1 and IF_N2 and may provide a corresponding setting value when image processing is performed on each frame. The control processor 200 may generate and transmit the setting information IF_N2 about the next N frames (for example, the $n+1^{th}$ to $2n^{th}$ frames Fn+1 to F2n) during a first period T1 where image processing is performed on the N frames (for example, the first to $n^{th}$ frames F1 to Fn). The first period T1 may be secured as a setting margin of the control processor 200, namely, a time margin for a control setting.

A transmitted/received signal and an operation of the image signal processor according to the comparative example will be described below with reference to FIG. 3B. The image signal processor according to the comparative example does not include an FRO circuit.

The image signal processor according to the comparative example may receive a respective one of setting information IF1 to IFn+2 from a control processor at every frame and may perform image processing on a corresponding frame on the basis of received setting information, and then, when image processing is completed, the image signal processor may transmit an interrupt signal to the control processor. For example, the image signal processor may receive the setting information IF1 including a setting value of a first frame F1 from the control processor and may perform image processing on the received first frame F1 on the basis of the setting information IF1. When image processing starts to be performed on the first frame F1, the image signal processor may transmit a start interrupt signal INT_S1 to the control processor, and when image processing is completed, the image signal processor may transmit an end interrupt signal INT_E1 to the control processor.

The control processor may generate and transmit the setting information IF2 about a next frame (for example, a second frame F2) when image processing is performed on the first frame F1, namely, until the end interrupt signal INT_E1 is received after the start interrupt signal INT_S1 is received.

As described above, according to an operation of the image signal processor according to the comparative example, the control processor may generate and transmit setting information about next one frame during a second period T2 where image processing is performed on one frame. The second period T2 may be secured as a setting margin of the control processor.

When image data is received at a high frame rate (for example, a frame rate equal to or greater than a predetermined, or alternatively, desired, threshold value, for example, 120 fps (frame per second), 240 fps, 960 fps, etc.), an image processing time of one frame may be shortened. In a case where the image signal processor according to the comparative example performs image processing, since the control processor has to generate and transmit setting information about a next frame during an image processing time (e.g., the second period T2) of one frame, a setting margin of the control processor may not be sufficient, and due to this, the image signal processor may not be normally controlled and may abnormally operate.

However, as described above, in a case where the image signal processor 100 according to some example embodiments performs image processing, the control processor 200 may secure N number of image processing periods (e.g., the first period T1) as a setting margin, and thus, a setting margin may be sufficiently secured. Accordingly, abnormal control by the control processor 200 may be prevented, and the image signal processor 100 may normally perform image processing on image data having a high frame rate.

Figure 4:
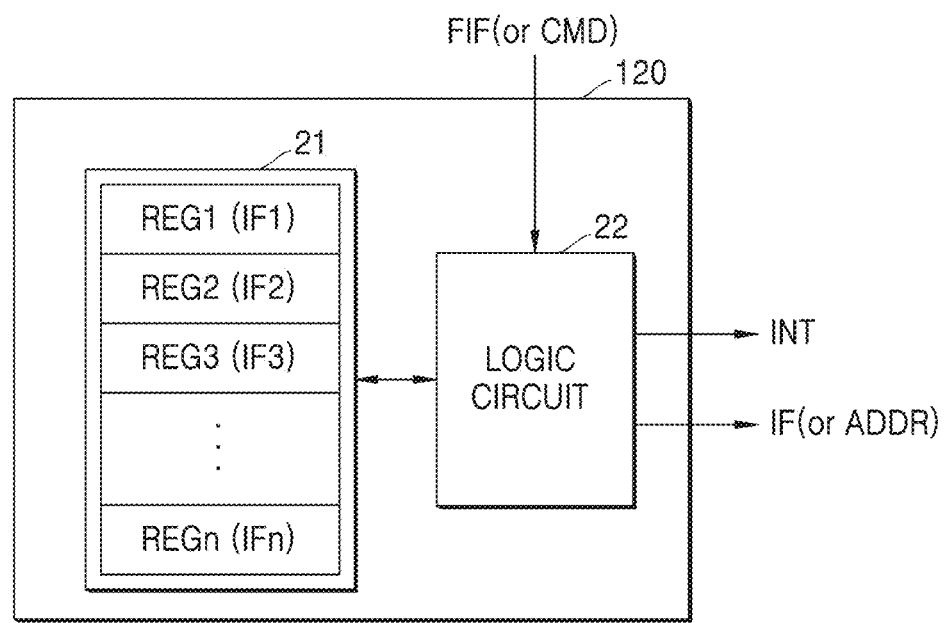
FIG. 4 is a block diagram illustrating an fast readout circuit of FIG. 1.

FIG. 4 is a block diagram illustrating the FRO circuit 120 of FIG. 1.

Referring to FIG. 4, an FRO circuit 120 may include a storage area 21 which stores setting information about N frames and a logic circuit 22.

The storage area 21 may store setting values (for example, first to $n^{th}$ setting values IF1 to IFn) of each of the N frames. For example, the storage area 21 may include N registers (e.g., first to $n^{th}$ registers) REG1 to REGn, and the first to $n^{th}$ registers REG1 to REGn may respectively store the first to $n^{th}$ setting values IF1 to IFn.

In response to a command CMD for requesting information FIF representing a frame on which image processing is performed or a setting value of a corresponding frame, the logic circuit 22 may read a setting value IF corresponding to the corresponding frame from the storage area 21 and may output the setting value IF of the corresponding frame or an address ADDR of the corresponding frame. For example, the logic circuit 22 may provide an ISP core (110 of FIG. 1) with register values for adjusting the image quality of a corresponding frame, or may provide a DMA controller (130 of FIG. 2) with an address register value of the corresponding frame or an address ADDR generated based on the address register value.

Figure 5:
FIG. 5 is a diagram exemplarily illustrating setting information received by an image signal processor according to an example embodiment.

FIG. 5 is a diagram exemplarily illustrating setting information received by an image signal processor according to an example embodiment.

As described above, an image signal processor (100 of FIG. 1) may receive setting information IF_N about N frames from the control processor 200. The setting information IF_N about the N frames may include a size 211 of received data, address register values 212 of the N frames (e.g., ADD_F1, ADD_F2, . . . , ADD_Fn), and frame information 213 about at which frame interrupt occurs (e.g., $F_{INT}$). The image signal processor 100 may generate an interrupt signal when image processing performed on a corresponding frame is completed, based on the frame information 213 about where an interrupt occurs.

In some example embodiments, the setting information IF_N may be received in a packet data format and may further include a header bit representing the start of packet data and tail bits representing an end of the packet data.

Figure 6:
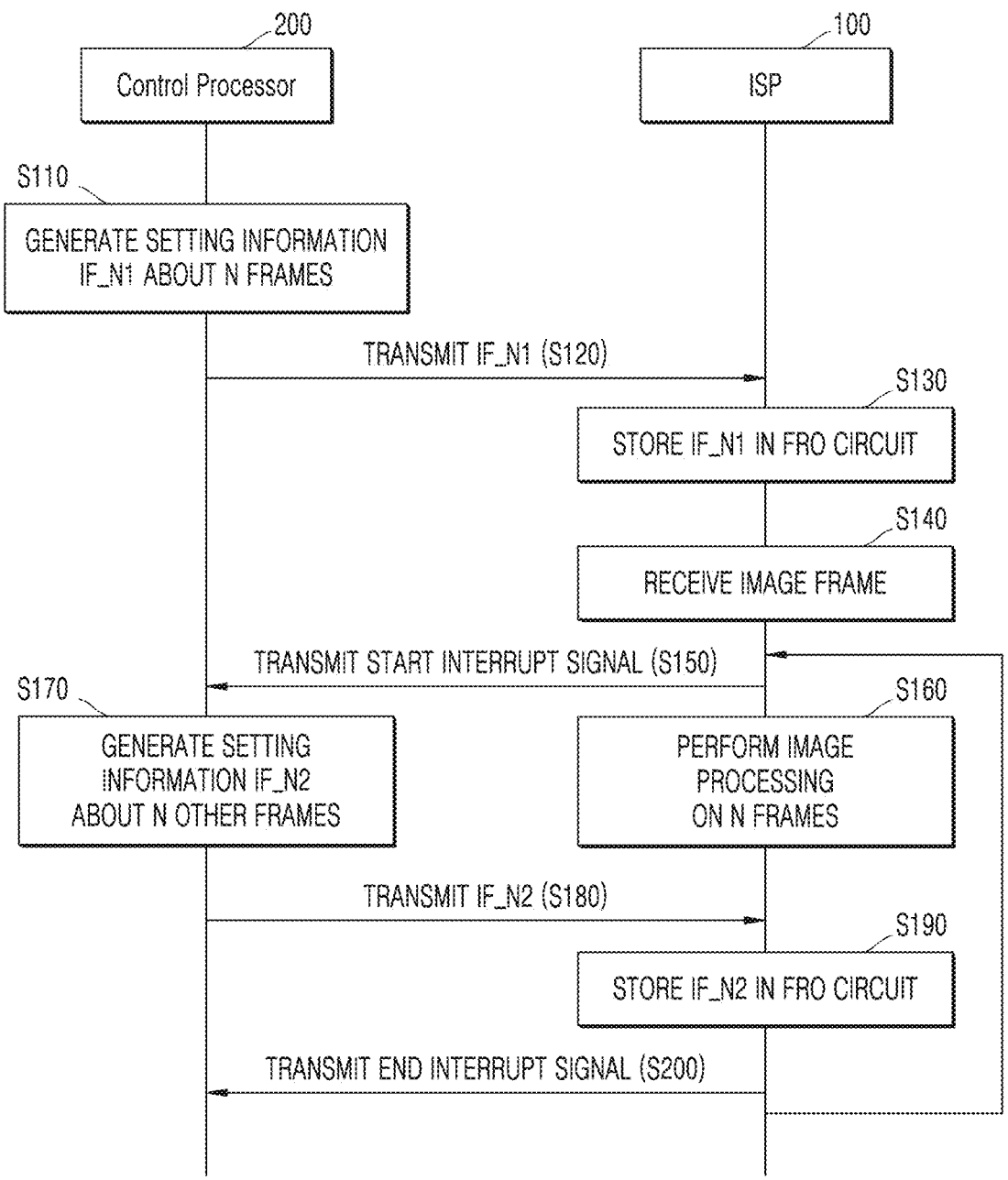
FIG. 6 is a flowchart illustrating an operating method of an image processing system according to an example embodiment.

FIG. 6 is a flowchart illustrating an operating method of an image processing system according to an example embodiment. FIG. 6 illustrates an operating method of each of the image signal processor 100 and the control processor 200 of FIG. 1.

Referring to FIG. 6, the control processor 200 may generate setting information IF_N1 about N frames in operation S110 and may transmit the setting information IF_N1 to the image signal processor 100 in operation S120. As described above with reference to FIG. 1, the control processor 200 may execute an instruction code and data for controlling the image signal processor 100 to generate the setting information IF_N1.

In detail, the FRO circuit 120 of the image signal processor 100 may store received setting information IF_N1 in operation S130. Subsequently, image frames may be received from an image sensor in operation S140, and the image signal processor 100 may transmit a start interrupt signal to the control processor 200 in operation S150 and may start to perform image processing.

In operation S160, the image signal processor 100 may perform image processing on the N frames on the basis of the setting information IF_N1. When image processing is performed on frames, the FRO circuit 120 may provide setting values of each of the frames on the basis of the setting information IF_N1, and the image signal processor 100 may perform image processing by units of frames on the basis of the setting values.

At this time, the control processor 200 may generate setting information IF_N2 about next N frames in operation S170 and may transmit the setting information IF_N2 to the image signal processor 100 in operation S180. In detail, the FRO circuit 120 of the image signal processor 100 may store received setting information IF_N2 in operation S190.

When image processing performed on the N frames is completed, the image signal processor 100 may transmit an end interrupt signal to the control processor 200.

Subsequently, the image signal processor 100 and the control processor 200 may repeatedly perform operations S150 to S200, and thus, the control processor 200 may generate and transmit setting information by units of N frames and the image signal processor 100 may perform image processing by units of frames, namely, may generate an interrupt signal by units of N frames and may transmit the interrupt signal to the control processor 200.

Figure 7:
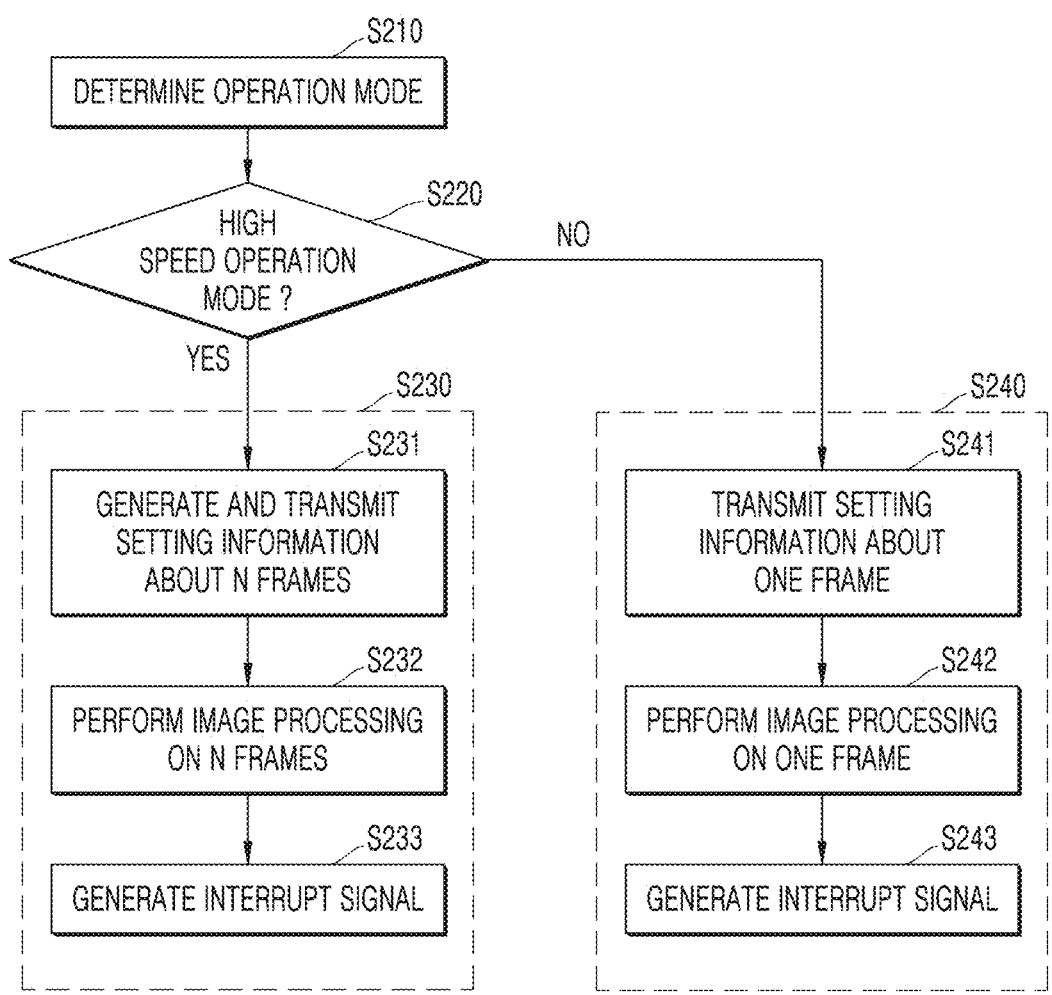
FIG. 7 is a flowchart illustrating an operating method of an image processing system according to an example embodiment.

FIG. 7 is a flowchart illustrating an operating method of an image processing system according to an example embodiment. The operating method of FIG. 7 may be performed by the image signal processor of FIG. 1.

Referring to FIG. 7, the image processing system 1200 may determine an operation mode in operation S210. The image processing system 1200 may determine the operation mode on the basis of a setting of a user, or may detect a frame rate of image data IDT received from the image sensor 1100 and may determine the operation mode on the basis of the detected frame rate. In some example embodiments, when frames are received from the image sensor 1100 at a high speed (for example, a speed of 240 fps or more), the image processing system 1200 may determine the operation mode as a high speed operation mode.

The image processing system 1200 may determine whether the determined operation mode is the high speed operation mode in operation S220, and when the determined operation mode is the high speed operation mode, as described above with reference to FIGS. 1 to 6, the image processing system 1200 may perform image processing by units of N frames in operation S230. The control processor 200 may generate setting information about N frames and may transmit the setting information to the image signal processor 100 in operation S231. The image signal processor 100 may perform image processing on the N frames in operation S232, and when image processing is completed, the image signal processor 100 may generate an interrupt signal in operation S233. In operation S231, the image signal processor 100 may substantially perform image processing by units of frames on the basis of setting values of a corresponding frame provided from the FRO circuit 120 included therein at every frame.

When the determined operation mode is not the high speed operation mode, namely, when the determined operation mode is a normal operation mode or a low speed operation mode, the image processing system 1200 may perform image processing by units of one frame in operation S240. The control processor 200 may generate setting information about one frame and may transmit the setting information to the image signal processor 100 in operation S241. The image signal processor 100 may perform image processing on one frame in operation S242, and when image processing is completed, the image signal processor 100 may generate an interrupt signal in operation S243.

Figure 8:
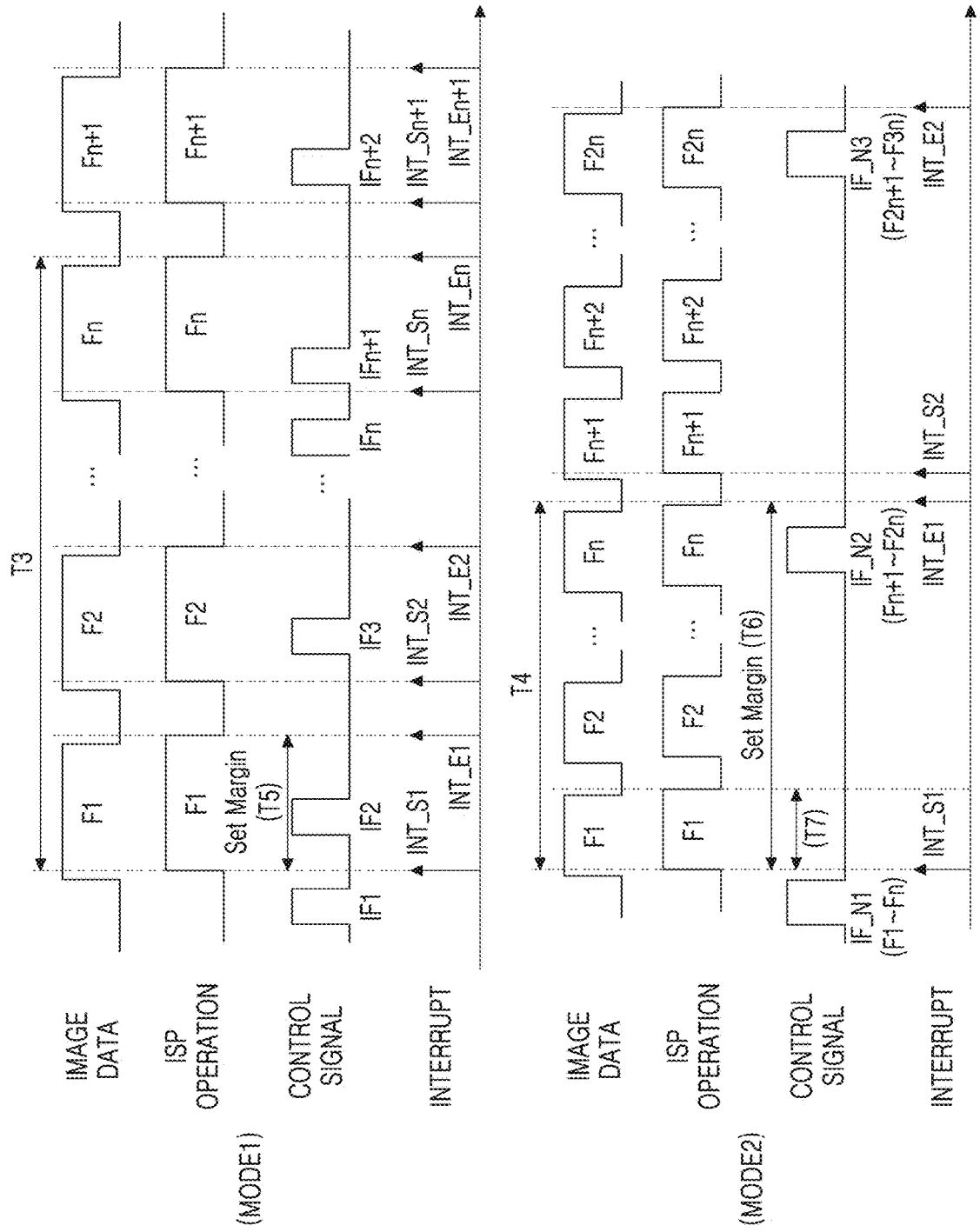
FIG. 8 is a timing diagram showing an operating method based on an operation mode of an image signal processor according to an example embodiment.

FIG. 8 is a timing diagram showing an operating method based on an operation mode of an image signal processor according to an example embodiment. FIG. 8 illustrates an operating method of the image signal processor 100 of FIG. 1.

Referring to FIGS. 1 and 8, a first operation mode may be a low speed or normal operation mode, and a second operation mode may be a high speed operation mode. When the image processing system 1200 operates in the second operation mode, a frame rate (e.g., a reception speed of image data) of the image data may be higher than a frame rate of the image data of when the image processing system 1200 operates in the first operation mode. A period T4 where N frames (for example, first to $n^{th}$ frames) are received and processed in the second operation mode may be relatively shorter than a period T3 where the N frames are received and processed in the first operation mode.

In the first operation mode, the image signal processor 100 may receive setting information IF1 to IFn+2 from the control processor 200 by units of frames. The image signal processor 100 may perform image processing by units of frames on the basis of the received setting information and may transmit interrupt signals (for example, start interrupt signals INT_S1 to INT_Sn+1 and end interrupt signals INT_E1 to INT_En+1) indicating the start and end of image processing to the control processor 200 at every frame.

In the second operation mode, the image signal processor 100 may receive setting information (for example, first to third setting information) IF_N1, IF_N2, and IF_N3 from the control processor 200 by units of N frames. For example, the first setting information IF_N1 may include setting values of first to $n^{th}$ frames F1 to Fn. The image signal processor 100 may perform image processing on the N frames and may generate and transmit interrupt signals (for example, start interrupt signals INT_S1 and INT_S2 and end interrupt signals INT_E1 and INT_E2) by units of N frames. In this case, the image signal processor 100 may substantially perform image processing by units of frames on the basis of setting values of each frame provided from the FRO circuit 120 which stores the setting information IF_N1, IF_N2, and IF_N3.

When the image signal processor 100 operates in the first operation mode, an image processing period T5 of one frame may be sufficient for the control processor 200 to generate setting information about a next frame. Therefore, in the first operation mode, the image processing period T5 of one frame may be secured as a setting margin of the control processor 200, and the control processor 200 may generate and transmit the setting information IF1 to IFn+2 by units of one frame. The image signal processor 100 may perform image processing by units of frames on the basis of received setting information. At this time, the FRO circuit 120 may be deactivated. When image processing performed on one frame is started, the image signal processor 100 may generate and transmit corresponding one of the interrupt signals INT_S1 to INT_Sn+1. When image processing performed on one frame is completed, the image signal processor 100 may generate and transmit corresponding one of the interrupt signals INT_E1 to INT_En+1.

When the image signal processor 100 operates in the second operation mode, namely, when a frame rate of image data is high, an image processing period T7 of one frame may be very short, and thus, the control processor 200 may not be sufficient to generate setting information about a next frame. Therefore, the control processor 200 may generate and transmit the setting information IF_N1 to IF_N3 by units of N frames, and thus, may secure a processing period T6 of N frames as a setting margin. The image signal processor 100 may store received setting information in the FRO circuit 120, and when image processing is performed on each frame, the image signal processor 100 may perform image processing on the basis of a setting value of a corresponding frame provided from the FRO circuit 120 and may store converted image data in the memory 300. When image processing performed on the N frames is started, the image signal processor 100 may generate and transmit the interrupt signals INT_S1 and INT_S2. When image processing performed on the N frames is completed, the image signal processor 100 may generate and transmit the interrupt signals INT_E1, and INT_E2.

As described above, the image signal processor 100 may change an operation mode on the basis of a frame rate of image data to adaptively change a frame setting method and an operation method. Accordingly, even when a frame rate of image data is changed, a setting margin of the control processor 200 may be sufficiently secured.

Figure 9:
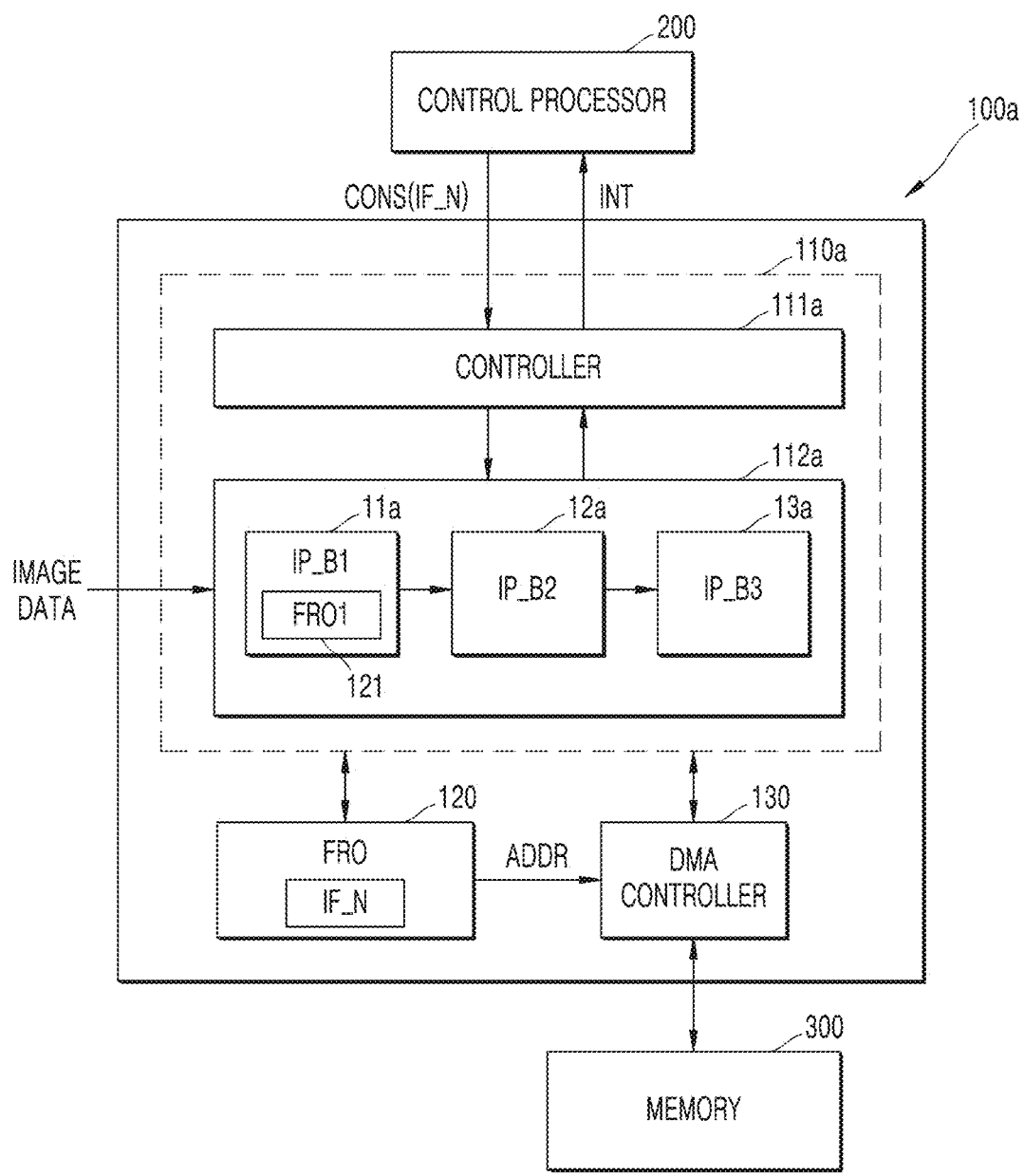
FIG. 9 is a block diagram illustrating an image signal processor according to an example embodiment.

FIG. 9 is a block diagram illustrating an image signal processor 100a according to an example embodiment. A configuration and an operation of the image signal processor 100a of FIG. 9 are similar to those of the image signal processor 100 of FIG. 2, and thus, a difference therebeween will be mainly described.

Referring to FIG. 9, the image signal processor 100a may include an ISP core 110a, an FRO circuit 120, and a DMA controller 130, and at least one IP block (for example, a first IP block 11a) of a plurality of IP blocks 112a (for example, first to third IP blocks 11a to 13a) included in the ISP core 110a may include an FRO circuit 121. A controller 111a may provide the FRO circuit (FRO1) 121 of the first IP block 11a with some setting information about the first IP block 11a among pieces of setting information IF_N about N frames received from a control processor 200. In a case which performs image processing on each of the N frames, the first IP block 11a may perform image processing on the basis of a setting value of a corresponding frame in setting information stored in the FRO circuit 121.

Figure 10:
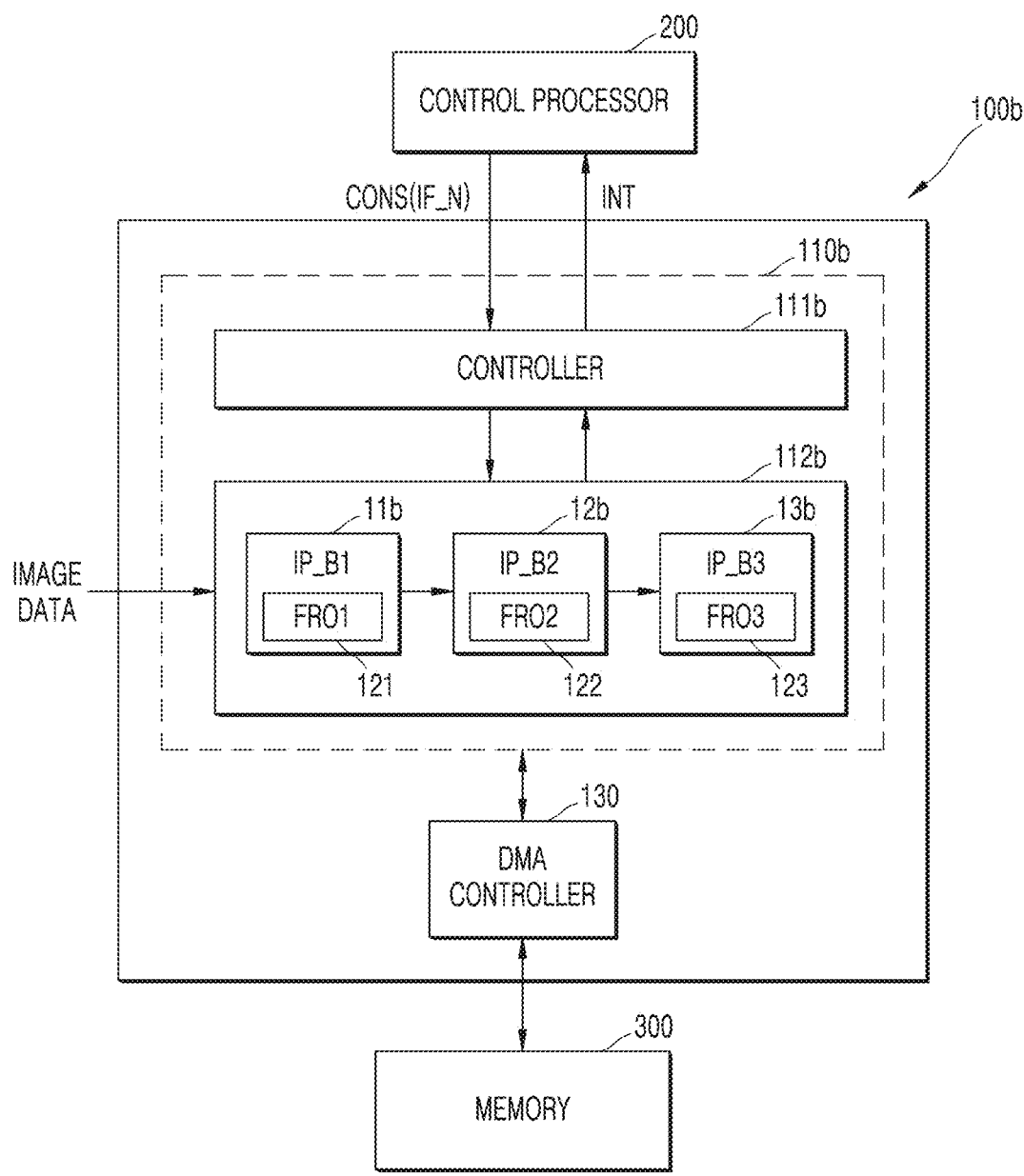
FIG. 10 is a block diagram illustrating an image signal processor according to an example embodiment.

FIG. 10 is a block diagram illustrating an image signal processor 100b according to an example embodiment.

The image signal processor 100b of FIG. 10 may include an ISP core 110b and a DMA controller 130. The ISP core 110b may include a plurality of IP blocks 112b (for example, first to third IP blocks 11b to 13b), and the first to third IP blocks 11b to 13b may respectively include FRO circuits (FRO1 to FRO3) 121 to 123. In other words, in the image signal processor 100b of FIG. 10, the FRO circuits FRO1 to FRO3 may be respectively included in the plurality of IP blocks 112b.

The controller 111b may provide each of the plurality of IP blocks 112b with setting information (e.g., setting values of N frames of each of the plurality of IP blocks 112b) about each of the plurality of IP blocks 112b among pieces of setting information IF_N about the N frames received from the control processor 200. Each of the plurality of IP blocks 112b may store received setting information in a corresponding FRO circuit included therein, and in a case which performs image processing on each frame, each of the plurality of IP blocks 112b may perform image processing on the basis of a setting value of a corresponding frame in setting information stored in a corresponding FRO circuit. Also, each of the plurality of IP blocks 112b may generate an address of a corresponding frame and may provide the address to the DMA controller 130, and thus, may store result data and/or converted image data based on image processing in a memory 300.

Figure 11:
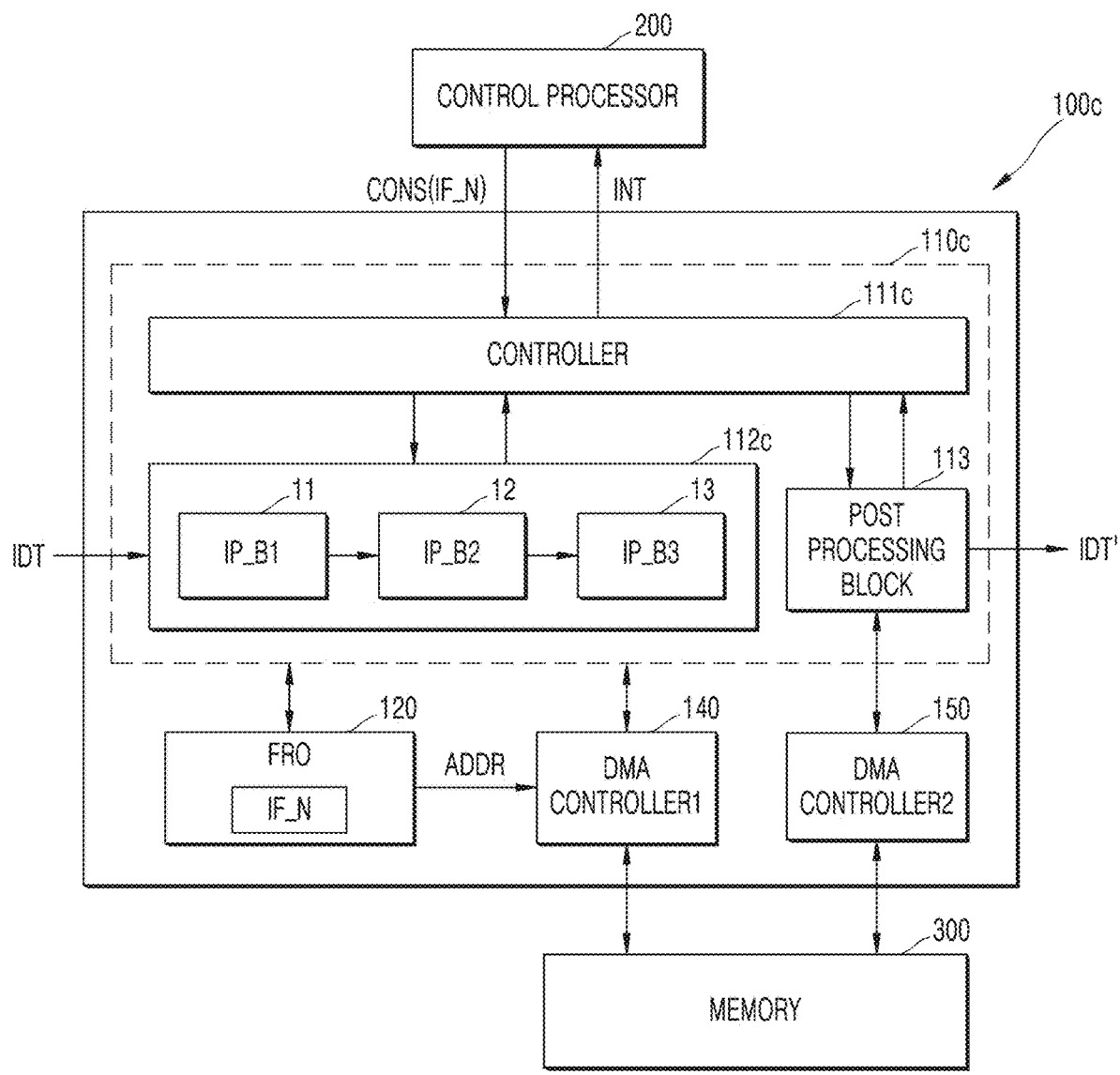
FIG. 11 is a block diagram illustrating an image signal processor according to an example embodiment.

FIG. 11 is a block diagram illustrating an image signal processor 100c according to an example embodiment.

The image signal processor 100c of FIG. 11 may include an ISP core 110c, an FRO circuit 120, a first DMA controller 140, and a second DMA controller 150. The ISP core 110c may include a controller 111c, a plurality of IP blocks 112c, and a post-processing block 113c.

A configuration and an operation of the image signal processor 100c of FIG. 11 are similar to those of the image signal processor 100 of FIG. 2. Therefore, a difference will be mainly described.

Referring to FIG. 11, a post-processing block 113c included in an ISP core 110c may perform post-processing on converted image data generated by each of a plurality of IP blocks 112c. For example, the post-processing block 113c may include a scaler, a joint photographic coding experts group (JPEG) circuit, etc.

Each of the plurality of IP blocks 112c may directly transmit the converted image data to the post-processing block 113c, or may store the converted image data in a memory 300 through a first DMA controller 140. At this time, as described above with reference to FIG. 2, the first DMA controller 140 may store the converted image data in the memory 300 on the basis of an address ADDR received from an FRO circuit 120 at every frame.

The post-processing block 113c may receive the converted image data from each of the plurality of IP blocks 112c, or may receive, through a second DMA controller 150, the converted image data stored in the memory 300. The post-processing block 113c may store post-processed image data IDT' in the memory 300 through the second DMA controller 150, or may output the post-processed image data IDT' to other elements (for example, a display) included in an image processing device (1000 of FIG. 1).

Figure 12:
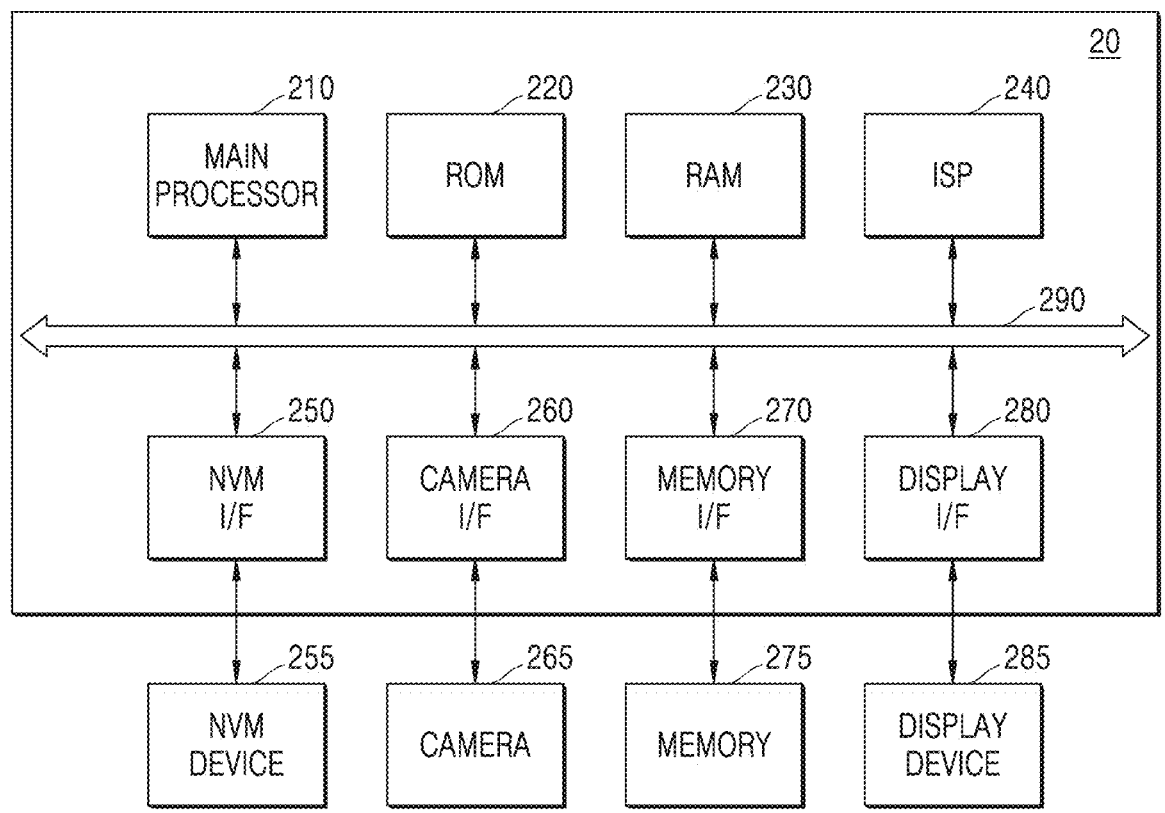
FIG. 12 is a block diagram illustrating an image processing system according to an example embodiment.

FIG. 12 is a block diagram illustrating an image processing system 20 according to an example embodiment.

Referring to FIG. 12, the image processing system 20 may include a main processor 210, a ROM 220, a RAM 230, an image signal processor 240, a non-volatile memory interface 250, a camera interface 260, a memory interface 270, and a display interface 280. The elements (e.g., the main processor 210, the ROM 220, the RAM 230, the image signal processor 240, the non-volatile memory interface 250, the camera interface 260, the memory interface 270, and the display interface 280) of the image processing system 20 may transmit or receive data through a system bus 290. In some example embodiments, the image processing system 20 may be implemented as a system-on chip (SoC). In some example embodiments, the image processing system 20 may be an application processor.

The main processor 210 may control an overall operation of the image processing system 20. The main processor 210 may be implemented with, for example, a CPU, a microprocessor, an ARM processor, an X86 processor, or an MIPS processor. According to some embodiments, the main processor 210 may be implemented with one computing component (e.g., a multi-core processor) including two or more independent processors (or cores). The main processor 210 may process or execute data and an instruction code (or programs) each stored in the ROM 220 or the RAM 230.

The ROM 220 may store programs and/or data which are/is used continuously. The ROM 220 may be implemented as EPROM or EEPROM.

The RAM 230 may temporarily store programs, data, and/or instructions. According to some embodiments, the RAM 230 may be implemented as DRAM or SRAM. The RAM 230 may temporarily store image data which is input/output through the interfaces 250 to 280 or is generated through image processing by the image signal processor 240.

The non-volatile memory interface 250 may interface data input from a non-volatile memory device 255 or data output to a non-volatile memory device 255. The non-volatile memory device 255 may be implemented with, for example, a memory card (for example, multi-media card (MMC), embedded multi-media card (eMMC), secure digital (SD) card, or micro SD card).

The camera interface 260 may interface image data (for example, raw image data) input from a camera 265 disposed outside the image processing system 20. The camera 265 may generate data corresponding to an image captured by using a plurality of light sensing devices. Image data received through the camera interface 260 may be provided to the image signal processor 240 or may be stored in a memory 275 through the memory interface 270.

The memory interface 270 may interface data input from the memory 275 or data output to the memory 275. According to some embodiments, the memory 275 may be implemented as a volatile memory such as DRAM or SRAM or a non-volatile memory such as ReRAM, PRAM, or NAND flash.

The display interface 280 may interface data (for example, image data) output to a display device 285. The display device 285 may output an image signal based on image data through a display such as a liquid crystal display (LCD) or an active matrix organic light emitting diode (AMOLED).

The image signal processor 240 may perform image processing on the image data provided from the camera 265 to generate converted image data and may store the converted image data in the memory 275 or may scale the converted image data to provide a scaled image to the display device 285.

The control processor and the image signal processor each described above with reference to FIGS. 1 to 11 may be respectively applied as the main processor 210 and the image signal processor 240. In a high speed operation mode, the main processor 210 may generate setting information by units of N frames and may transmit the setting information to the image signal processor 240, and when image processing performed on the N frames is completed, the image signal processor 240 may transmit an interrupt signal to the main processor 210. The image signal processor 240 may include an FRO circuit (120 of FIG. 1), and the FRO circuit may store the setting information. When image processing is performed on each frame, the FRO circuit may provide a setting value of a corresponding frame. Accordingly, even in the high speed operation mode, the image signal processor 240 may normally perform image processing.

Figure 13:
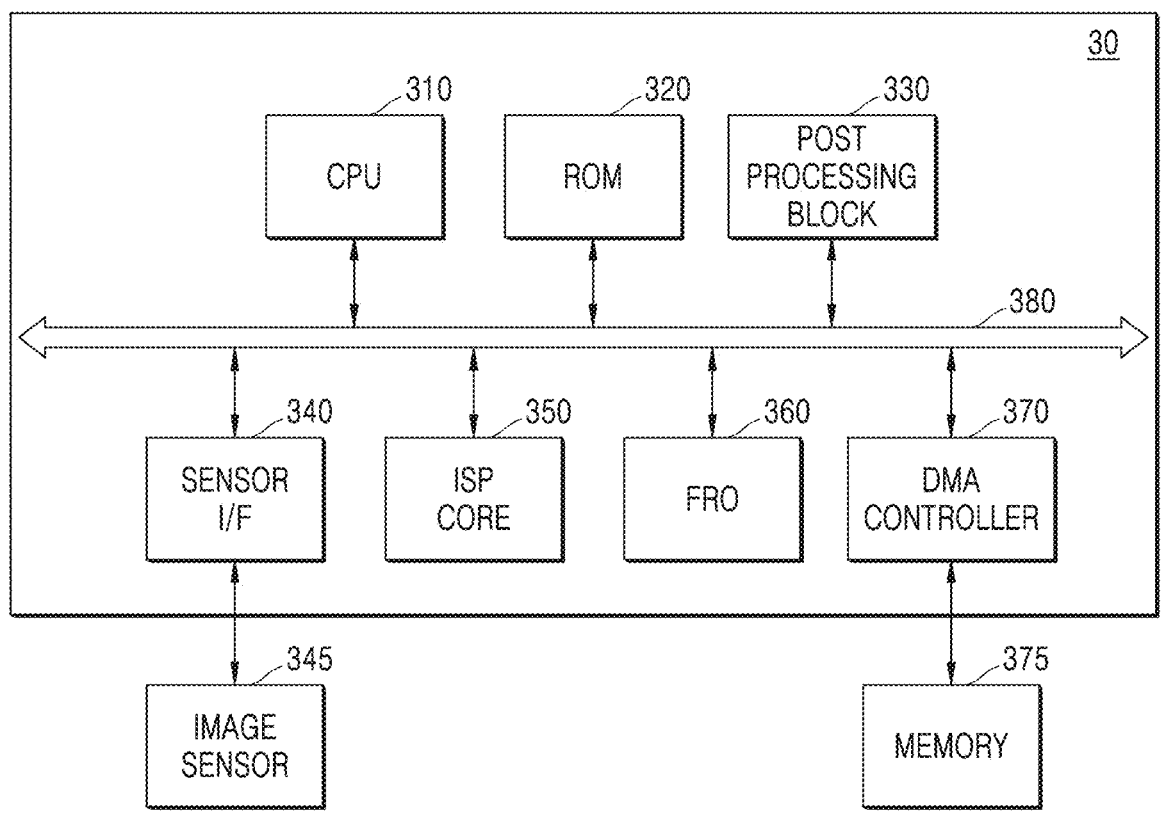
FIG. 13 is a block diagram illustrating an image processing system according to an example embodiment.

FIG. 13 is a block diagram illustrating an image processing system 30 according to an example embodiment.

Referring to FIG. 13, the image processing system 30 may include a CPU 310, a ROM 320, a post-processing block 330, a sensor interface 340, an ISP core 350, an FRO circuit 360, and a DMA controller 370. The CPU 310, the ROM 320, the post-processing block 330, the sensor interface 340, the ISP core 350, the FRO circuit 360, and the DMA controller 370 may transmit or receive data through a system bus 380.

The CPU 310 may control an overall operation of the image processing system 30 and may process or execute programs stored in the ROM 320 to control an image processing operation.

The ROM 320 may store data and/or an instruction code (e.g., programs) including an image processing algorithm.

The post-processing block 330 may perform post-processing (for example, adjusting a size of data, or compressing data) on converted image data generated by the ISP core 350. Post-processed image data may be stored in a memory 375 through the DMA controller 370.

In some example embodiments, the image processing system 30 may further include a display interface, and the post-processed image data may be provided to a display device through the display interface. Alternatively, the image data stored in the memory 375 may be read through the DMA controller 370 and may be provided to the display device through the display interface.

The sensor interface 340 may communicate with an image sensor 345 and may receive image data (for example, raw image data) from the image sensor 345.

The control processor, the ISP core, the FRO circuit, and the DMA controller each described above with reference to FIGS. 2, 9, 10, and 11 may be respectively applied as the CPU 310, the ISP core 350, the FRO circuit 360, and the DMA controller 370. In a high speed operation mode, the CPU 310 may generate setting information by units of N frames and may transmit the setting information to the ISP core 350, and when image processing performed on the N frames is completed by the ISP core 350, the FRO circuit 360 may transmit an interrupt signal to the CPU 310. The FRO circuit 360 may store the setting information, and when image processing is performed on each frame, the FRO circuit 360 may provide a setting value of a corresponding frame to the ISP core 350 and/or the DMA controller 370. Therefore, image processing may be performed by units of one frame, and processing data may be stored in the memory 375. Even in a high speed operation mode, the image processing system 30 may normally perform image processing and may store image-processed image data (for example, converted image data or post-processed image data) in the memory 375.

Figure 14:
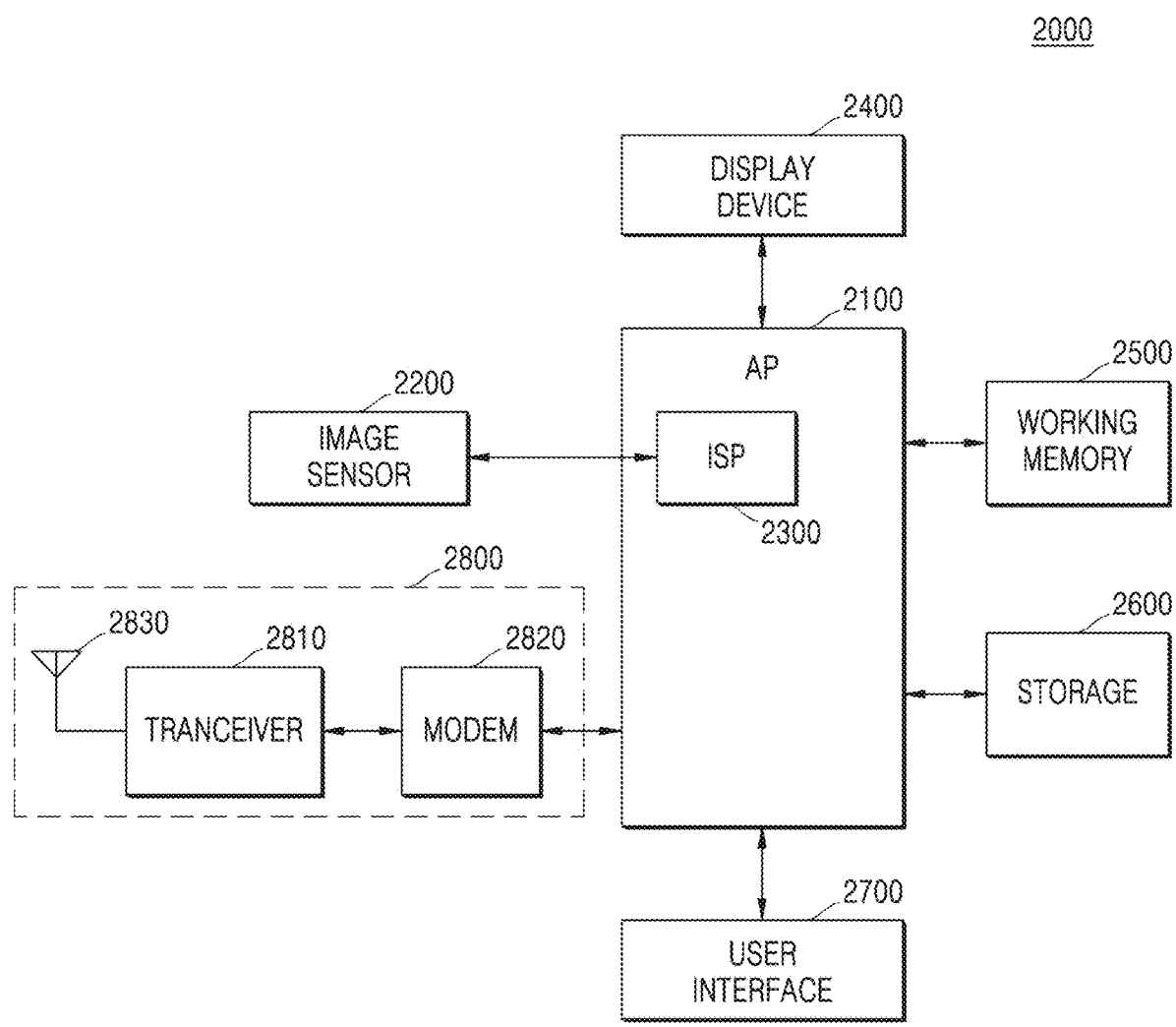
FIG. 14 is a block diagram illustrating an image processing device according to an example embodiment.

FIG. 14 is a block diagram illustrating an image processing device 2000 according to an example embodiment. The image processing device 2000 of FIG. 14 may be a portable terminal.

Referring to FIG. 14, the image processing device 2000 according to some example embodiments may include an application processor (AP) 2100, an image sensor 2200, a display device 2400, a working memory 2500, a storage 2600, a user interface 2700, and a wireless transceiver 2800, and the application processor 2100 may include an image signal processor (ISP) 2300. The image signal processor 100 of FIG. 1 may be applied as the image signal processor 2300. In some embodiments, the image signal processor 100 may be implemented as a separate integrated circuit independently from the application processor 2100.

The application processor 2100 may control an overall operation of the image processing device 2000 and may be provided as an SoC which drives an application program and an operating system (OS).

The application processor 2100 may control an operation of the image signal processor 2300 and may provide or store converted image data, generated by the image signal processor 2300, to the display device 2400 or in the storage 2600.

The image sensor 2200 may generate image data (for example, raw image data) on the basis of a received light signal and may provide the image data to the image signal processor 2300.

The image signal processor described above with reference to FIGS. 1 to 11 may be applied as the image signal processor 2300. The image signal processor 2300 may receive setting information about an $N^{th}$ frame from a processor included in the application processor 2100 and may perform image processing on the $N^{th}$ frame on the basis of the setting information. When image processing performed on the $N^{th}$ frame is completed, the image signal processor 2300 may transmit an interrupt signal to the processor.

The working memory 2500 may be implemented as a volatile memory such as DRAM or SRAM or a non-volatile resistive memory such as FeRAM, RRAM, or PRAM. The working memory 2500 may store programs and/or data each processed or executed by the application processor 2100.

The storage 2600 may be implemented as a non-volatile memory device such as NAND flash or a resistive memory, and for example, may be provided as a memory card (for example, MMC, eMMC, SD, or micro SD). The storage 2600 may store data and/or a program which correspond(s) to an execution algorithm for controlling an image processing operation of the image signal processor 2300, and when the image processing operation is performed, the data and/or the program may be loaded into the working memory 2500. In some embodiments, the storage 2600 may store image data (for example, converted image data or post-processed image data) generated by the image signal processor 2300.

The user interface 2700 may be implemented with various devices, such as a keyboard, a curtain key panel, a touch panel, a fingerprinted sensor, and a microphone, for receiving a user input. The user interface 2700 may receive the user input and may provide the application processor 2100 with a signal corresponding to the received user input.

The wireless transceiver 2800 may include a transceiver 2810, a modem 2820, and an antenna 2830.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

While the inventive concepts has been particularly shown and described with reference to embodiments thereof, it will be understood that various changes in form and details may be made therein without departing from the spirit and scope of the appended claims.

What is claimed is:

1. An image processing system comprising:
   a control processor configured to
      detect a frame rate of image data,
      determine an operation mode based on the frame rate of the image data being above a threshold,
      generate and output setting information corresponding to N, where N is an integer of 2 or more, image frames based on the operation mode; and
   an image signal processor configured to
      perform image processing on the N image frames received from an image sensor based on the setting information, and
      generate and transmit an interrupt signal to the control processor based on completion of the image processing performed on the N image frames.

2. The image processing system of claim 1, wherein the setting information includes a setting value of each of the N image frames.

3. The image processing system of claim 1, wherein the image signal processor includes a plurality of image processing blocks, each of the plurality of image processing blocks configured to perform set image processing;
a direct memory access (DMA) controller configured to store, in a memory, processing data generated by each of the plurality of image processing blocks; and
a fast readout circuit configured to
store the setting information, and
provide a setting value of an image frame on which image processing is performed to the plurality of image processing blocks or the DMA controller based on the image processing being sequentially performed on the N image frames.

4. The image processing system of claim 3, wherein at least one image processing block of the plurality of image processing blocks is configured to store setting information about the at least one image processing block from among the setting information.

5. The image processing system of claim 3, wherein the setting value includes an address register value representing an area where converted image data generated by performing image processing is to be stored.

6. The image processing system of claim 3, wherein the DMA controller is configured to
receive the setting value or an address from the fast readout circuit, and
store the processing data in an area of the memory corresponding to the setting value or the address, the processing data received from each of the plurality of image processing blocks.

7. The image processing system of claim 3, wherein the fast readout circuit comprises N registers configured to store a setting value of each of the N image frames included in the setting information.

8. The image processing system of claim 1, wherein the control processor is configured to generate setting information related to the next N image frames and transmit the generated setting information to the image signal processor based on the image signal processor performing image processing on the N image frames.

9. The image processing system of claim 1, wherein the setting information includes
N address register values representing areas where pieces of converted image data of the N image frames are to be stored, and
information about an image frame where an interrupt signal is to be generated.

10. The image processing system of claim 1, wherein the image signal processor includes
a plurality of image processing blocks, each image processing block configured to perform set image processing; and
a direct memory access (DMA) controller configured to store, in a memory, processing data generated by each of the plurality of image processing blocks, and
each of the plurality of image processing blocks includes
a fast readout circuit configured to
store corresponding setting information from among the setting information, and
provide a setting value of an image frame on which image processing is performed to the DMA controller based on image processing being sequentially performed on the N image frames.

11. An image signal processor comprising:
an image processing circuit configured to sequentially perform image processing on image frames received from an image sensor based on a frame rate of the image frame being above a threshold;
a direct memory access (DMA) controller configured to store, in a memory, processing data generated by the image processing circuit; and
a fast readout circuit configured to receive, from a control processor, setting information including N, where N is an integer of 2 or more, setting values corresponding to N image frames, and provide a setting value of an image frame on which image processing is performed, to the image processing circuit or the DMA controller, based on image processing being sequentially performed on the N image frames.

12. The image signal processor of claim 11, wherein the fast readout circuit is configured to generate an interrupt signal provided to the control processor based on completion of the image processing performed on the N image frames.

13. The image signal processor of claim 11, wherein the setting value includes an address register value representing an area where an image processing result of each of the image frames or a converted image frame based on image processing is to be stored.

14. The image signal processor of claim 13, wherein the fast readout circuit is configured to
be in an activate state and store and output the N setting values based on the image signal processor operating in a first mode, and
be in a deactivate state based on the image signal processor operating in a second mode.

15. The image signal processor of claim 14, wherein, in the first mode, a frame rate of each of the N image frames received from the image sensor is 240 fps (frames per second) or more.

16. An operating method of an image signal processor, the operating method comprising:
receiving N, where N is an integer of 2 or more, setting values from a control processor;
storing the N setting values in a storage area;
receiving image frames from an image sensor;
sequentially performing image processing on N image frames from among the image frames based on the N setting values based on a frame rate of the image frame being above a threshold; and
generating an end interrupt signal based on completion of the image processing performed on the N image frames.

17. The operating method of claim 16, further comprising:
receiving N other setting values from the control processor,
wherein the receiving of the N other setting values is performed simultaneously with the performing of the image processing.

18. The operating method of claim 17, further comprising:
generating a start interrupt signal,
wherein the receiving of the N other setting values is performed between a time when the start interrupt signal is generated and a time when the end interrupt signal is generated.

19. The operating method of claim 16, wherein the performing the image processing comprises storing an image processing result of each of the image frames in an area of a memory represented by a setting value, from among the N setting values, corresponding to image frames on which image processing is performed.

20. The operating method of claim 16, wherein the performing the image processing includes receiving, by an image processing engine, a current setting value from among the N setting values, from the storage area, and performing image processing based on the current setting value, wherein the current setting value corresponds to an image frame on which image processing is being currently performed.

* * * * *